United States Patent Office 3,138,469
Patented June 23, 1964

3,138,469
SPALLING RESISTANT PERICLASE BRICK
James W. Craig, Montreal, Quebec, Lisle Hodnett, Hudson, Quebec, and Frank E. Lathe, deceased, late of Ottawa, Ontario, Canada, by Toronto General Trusts Corporation, now by merger Canada Permanent Toronto General Trust Company, executor, assignors to Harbison-Walker Refractories Company, Pittsburgh, Pa.
No Drawing. Filed July 24, 1961, Ser. No. 130,214
6 Claims. (Cl. 106—59)

This invention relates to a low-iron periclase brick made spalling-resistant by the inclusion of relatively coarse particles of particular oxide and oxide combinations possessing specific properties.

This application is a continuation-in-part of application Serial Number 843,633, filed October 1, 1959, now abandoned.

Susceptibility to spalling when subjected to thermal shock has always been one of the greatest weaknesses of periclase brick. Pure periclase has extremely high refractoriness, far beyond normal requirements of the metallurgical industry, where temperatures in the range 1500–1700° C. (2732–3092° F.) are common. It also has unusually high resistance to the action of basic and neutral slags, even at the highest operating temperatures. In spite of these major advantages, its use has been limited by its tendency to spall when subjected to thermal shock, and, because of this, many attempts have been made over a period of years to discover methods of overcoming this weakness.

For example, French Patent 802,518, granted to Magnesital G.m.b.H. on June 13, 1936, claims that materials such as chrome ore, chromic oxide, manganese ore and talc in proportions from 2 to 6% are effective in conferring high thermal spalling resistance, the material being finely milled and added to periclase of specified grain sizes before moulding the brick. Similarly, Erdmann (U.S. 2,063,543) makes a magnesite brick containing 2–6% alumina, preferably of grain size between 0.001 and 0.100 mm., that is, extremely fine. More recently, Bargezi (U.S. 2,744,021) has attempted to produce thermal spalling resistance by the addition of several materials to a so-called "synthetic" magnesia (actually, magnesium hydroxide produced by reacting dolomite with sea water), to give the mix (1) 1–4% $Fe_2O_3$, (2) 3–6.5% of a sesquioxide, chosen from alumina and chromic oxide, and (3) 1–7% of the lime plus silica in proportions below 0.8:1.0. He indicates that the very fine grain size specified by Erdmann is satisfactory. All of the above additions will to a degree modify the properties of a magnesite brick, but in no case do they render the brick sufficiently resistant to thermal spalling to make them generally applicable in metallurgical furnaces where they are subjected to temperature changes of large magnitude.

Intensive research carried out over a period of years has now yielded information which indicates both why the results of previous investigators have been relatively unsuccessful, and how spalling resistance of a much higher order can be readily and economically obtained. Several factors are involved.

First, it has been discovered that periclase brick of exceptionally high density and strength are generally more susceptible to spalling than those of lower density and strength. Presumably, in the less dense brick it is easier for the constituent grains to make minor adjustments of their position when the application of heat on one or more faces sets up stresses in the brick. Such additions as iron oxide, which is one of the most effective shrinking agents for magnesia and increases the strength of periclase brick, are therefore indicated as undesirable when the highest spalling resistance is required.

Second, to be most effective in producing spalling resistance, additives should have coefficients of linear thermal expansion not higher than that of periclase $(13.7 \times 10^{-6})$. When an additive with a higher coefficient of expansion, such as beta dicalcium silicate $(14.7 \times 10^{-6})$ or magnetite $(14.5 \times 10^{-6})$ is used, and the brick is heated and cooled, the additive is ineffective in improving spalling resistance. It is also desirable that the expansion which takes place on heating be reversible on cooling. In the case of chrome ore $(8.2 \times 10^{-6})$ it at first expands normally, but as its contained iron is oxidized and reduced in service it "grows" irreversibly, hence on cooling, does not shrink to its original size. While, therefore, it does initially confer spalling resistance, this property may not be permanently retained, and, when a brick is cooled after a period of service, it may spall.

Third, relatively coarse additives normally confer much more spalling resistance than do fine additives. For various reasons the range of usable grain size is from about 4 mesh (Tyler standard) (0.185 in. or 4.7 mm.) down to 28 mesh (0.0232 in. or 0.59 mm.). Even within this range, the finer grain sizes are much less effective than the coarse, and, in practice, the preferred range is about 6 mesh (0.131 in. or 3.33 mm.) down to 14 mesh (0.046 in. or 1.17 mm.).

The additives effective in complying with the above requirements are chromic oxide, magnesium chromite, mixtures thereof, magnesium chromite with excess MgO, magnesium aluminate with excess MgO and magnesium aluminate or chromic oxide with some free alumina. When excess MgO is present the total MgO content of the additive may not exceed 50% by weight, otherwise the coefficient of linear thermal expansion will not be sufficiently different from that of the periclase to impart spalling resistance. When free $Al_2O_3$ is present in the additive it must be restricted to 30% by weight of the additive. That is to say 0.75 times the weight percent of $Cr_2O_3$ plus 1.58 times the weight percent of alumina minus 1.33 times the weight percent of MgO in the additive must not exceed 100. Free alumina as used herein is that which is not combined with MgO. More than this amount of free alumina causes deleterious expansile effects due to reaction with MgO. Thus when there is free MgO present in the additive there should be no free (uncombined) alumina. Conversely when free alumina is present in the additive there should be no free MgO. On the other hand, since the reaction between $Cr_2O_3$ and MgO to form magnesium chromite exerts less expansile tendency free MgO and $Cr_2O_3$ may be present simultaneously.

It will be recognized that optimum beneficial effect is obtained when the additive particles are composed of chemically pure constituents. However, beneficial effects of the invention are obtained when the particles contain at least 90%, and preferably 95%, of chemically pure constituent. For example, if $Al_2O_3$ is present in the additive it may be derived from "Bayer" alumina, which contains some $Na_2O$ as an impurity, or bauxite which may contain $SiO_2$ and $TiO_2$. Similarly if the additive contains MgO it may be derived from sea water or other magnesia which contain some $SiO_2$ and CaO.

The object of the present invention is to provide particular compositions for refractory periclase brick which are resistant to thermal spalling.

In determining spalling resistance there has been adopted a severe test developed in Canada, and considered very satisfactory for brick of high spalling resistance. It consists in subjecting the end of a brick alternately to (1) radiation from a furnace wall at 1100° C. and at a distance of two inches for 45 min., and (2) a blast of air at room temperature for 15 min. This cycle is repeated until either the end of the brick breaks off or it remains whole after ten cycles, the latter being taken as adequate spalling resistance. Brick which have spalled are rated from one to ten, according to the number of the cycle in which failure has occurred. Brick which have successfully passed the test are differentiated as follows:

10+ ............... Large cracks, but end adhering.
10++ .............. Many small cracks.
10+++ ............. One or several short, hairline cracks.
10++++ ............ Intact, apparently unaffected.

Heretofore known periclase brick subjected to this test have on the average spalled at 3 to 4 cycles.

The effect of various additions to a periclase brick, all rated according to the above test, are shown in the following table, which in nearly all cases covers four to six brick per test. When brick have not all failed in the same cycle, or are rated differently at the end of the test, the number of brick which give a particular rating appears in brackets following the rating.

| Material added | Expansion Coefficient ($\times$ by $10^{-6}$) | Percent by weight | Mesh size | Cycles to failure or condition at end |
|---|---|---|---|---|
| None (Control) | 13.7 | None | | 2(2),3,5,6 |
| Suitable: | | | | |
| $MgO \cdot Al_2O_3$ | 8.1 | 3 | −6+28 | 10++++ |
| $MgO \cdot Al_2O_3$ | 8.1 | 5 | −6+28 | 10++++ |
| $MgO \cdot Al_2O_3$ | 8.1 | 10 | −6+28 | 10++++ |
| $MgO \cdot Al_2O_3$ | 8.1 | 30 | −6+28 | 10++++ |
| $MgO \cdot Al_2O_3 + MgO$ (total MgO 45%) | medium | 10 | −6+14 | 10++++ |
| $MgO \cdot Al_2O_3 + Al_2O_3$ (total $Al_2O_3$ 77%) | low | 5 | −4+28 | 10++++ |
| $MgO \cdot Cr_2O_3$ | | 3 | −6+28 | 10++++ |
| $MgO \cdot Cr_2O_3$ | | 5 | −6+28 | 10++++ |
| $MgO \cdot Cr_2O_3$ | | 10 | −6+28 | 10++++ |
| $MgO \cdot Cr_2O_3 + MgO$ (total MgO 50%) | medium | 20 | −6+28 | 10+++ |
| $Cr_2O_3$ | low | 5 | −6+28 | 10+++ |
| $Cr_2O_3$ | low | 10 | −10+28 | 10+++ |
| Unsuitable: | | | | |
| $Fe_2O_3$ | 12.2 | 10 | −6+28 | 10++(6) |
| $Fe_2O_3$ reburned | 12.2 | 10 | −6+28 | 4,6 |
| $MgO \cdot Fe_2O_3$ | 12.7 | 11 | −6+20 | 2(2) |
| $MgO \cdot Al_2O_3$ | 8.1 | 10 | −100 | 2,3,5 |
| $Cr_2O_3$ | low | 5 | −100 | 2(3) |

It will be seen by the table that (1) suitable additives are characterized by having coefficients of linear thermal expansion lower than that of periclase, (2) chromic oxide, magnesium chromite, magnesium aluminate are excellent additives, when of coarse grain size, for conferring spalling resistance upon periclase brick, (3) fine additives are unsuitable, (4) magnesium ferrite, which introduces much iron, is quite unsatisfactory, and (5) ferric oxide, when coarse, initially confers good spalling resistance, but most of this is lost, even in an ordinary reburn, due to the absorption of the oxide by periclase, hence it would not maintain spalling resistance in service, and must be classified with the unsatisfactory additives.

Obviously, this invention is important in providing a simple and economical means of producing periclase brick which, instead of being of inferior spalling resistance and unsuitable for general application where they will be exposed to severe thermal shock, are much superior in spalling resistance to most other brick with which in the past they have been unable to compete. Further, this has been accomplished with a gain, instead of a loss, in refractoriness under load.

The principal limits of the invention can now be summarized from the data of the table and what has already been said.

In regard to coefficient of linear thermal expansion, this should not be less than that of periclase, and should preferably be under $12 \times 10^{-6}$. Excellent results have been obtained from additives with a coefficient about $8 \times 10^{-6}$.

The dead-burned periclase used in making the brick should preferably be substantially iron-free, and no iron should be intentionally added. Since a little iron has only a moderate effect on periclase, some can be tolerated without complete loss of the advantages of the invention, but in no case should the iron (Fe) content of the brick be substantially above 2.0%. This limitation will also have the advantage that, in a cyclic test with changes in temperature or atmosphere, the danger of failure due to repeated changes in the degree of oxidation of the iron or to the deposition of carbon by the catalytic action of the iron will be minimized.

It is also desirable that other impurities be substantially absent from the periclase used. If there be appreciable lime in the periclase, the addition of even 5% of alumina may undesirably lower the refractoriness, whereas 5% of chromic oxide could readily be tolerated. Similarly, one should avoid having appreciable lime and silica present in the brick in equimolecular proportions, regardless of the nature of the additive, for low-melting monticellite ($CaO \cdot MgO \cdot SiO_2$) would be formed. Silica without appreciable lime can be tolerated up to say 5% in the periclase used, since it will merely form refractory forsterite. In the practice of the invention one has therefore only to take precautions well known in the art, avoiding in the finished brick any combination of oxides which can be considered incompatible, in so far as refractoriness is concerned; in the claims which follow, the word "incompatible" is used in this sense. In general, the periclase used should contain at least 90% MgO, and not more than about 2% of lime.

The preferred grain size of the additive, as mentioned above, is about 6 mesh (0.131" or 3.33 mm.) down to 14 mesh (0.046" or 1.17 mm.) and the practical limits of the invention are 4 mesh (0.185" or 4.7 mm.) down to 28 mesh (0.0232" or 0.59 mm.). When coarser than 4 mesh the brick are more difficult to press, and when finer than 28 mesh, little or nothing is gained in spalling resistance.

The grain sizing of brick making compositions is well known in the art. They contain coarse, intermediate and fine fractions in selected proportions. They may not contain too high a proportion of coarse particles or the brick will not hold together, nor too high a proportion of fine particles or the brick will laminate during pressing. Restrictions must also be placed on the size of the coarsest particles. In practice the size of the coarsest particle is not greater than 3 mesh. In general such compositions contain 45–75% by weight of plus 28 mesh particles in which the weight ratio of plus 10 mesh to minus 10 plus 28 mesh lies between 0.66 and 1.33 and at least 20% of particles finer than 65 mesh.

It will of course be recognized that, when any considerable quantity of coarse additive is incorporated in a brick mix, the proportion of coarse periclase should be reduced by an amount corresponding to that of the additive, so as to maintain the over-all grain size at the desired percentages.

In making spalling-resistant periclase brick, 98–70% by weight of periclase is combined with 2 to 30% by weight of the additive. With less than 2% of coarse additive, it is difficult to secure uniform distribution throughout the brick, and the spalling resistance also falls off materially. In most cases, 2 to 8% of additive is adequate, but—particularly with the smaller grain sizes—considerably larger proportions may be required to give the desired spalling resistance. Excellent spalling resistance is secured with 30% of the additive and in any particular case one will, of course, select such a proportion as will give the desired combination of strength and spalling resistance. Beyond 30%, there is usually little additional improvement in spalling resistance, and with these higher proportions the other properties of the brick are often substantially changed.

While particles of alumina, as an additive, will provide spalling resistance, the highly expansile effect of the reaction of alumina with MgO tends to disrupt the brick, increase its porosity, decrease its strength and make the brick unsuitable for many uses. However it has been found that by limiting the amount of free alumina in the additive to 30% difficulties caused by the expansile reaction do not arise.

It is expected that the maximum advantages of the invention will be obtained in applying its findings to the manufacture of burned brick, but, since every refractory brick is at least partially burned in service, they are also applicable to the manufacture of chemically bonded, or unburned brick.

The coefficients of linear thermal expansion quoted above are for the approximate range 100–900° C. Since different investigators use materials of various degrees of purity and quote results for various temperatures and temperature intervals, the values herein quoted must not be considered definitive of the materials used. The significant point is that the expansion coefficient of the additive must be lower than that of the periclase matrix.

What is claimed is:

1. A composition for the production of refractory brick having high thermal spalling resistance and low iron content consisting essentially of (1) 98 to 70 percent by weight of dead burned periclase containing at least 90 percent of MgO and not more than 2 percent of lime, and (2) 2 to 30 percent by weight of a relatively coarse dimensionally stable particulate additive selected from the group consisting of chromic oxide, chromic oxide with free alumina, magnesium chromite, magnesium chromite with excess MgO, magnesium aluminate with excess MgO, and magnesium aluminate with free alumina, and in which (a) the weight percent of any $Cr_2O_3$, MgO and $Al_2O_3$ present is at least 90%, (b) the weight percent of MgO present is less than 50% to limit the coefficient of linear thermal expansion, (c) 0.75 times the weight percent of $Cr_2O_3$ plus 1.58 times the weight percent of $Al_2O_3$ minus 1.33 times the weight percent of MgO is not more than 100 to restrict the weight percent of free $Al_2O_3$, and (d) the weight percent of free $Al_2O_3$ is not more than 30% to avoid deleterious expansile effects due to reaction with MgO, said additive having a coefficient of linear thermal expansion less than that of said periclase, said additive having a particle size of plus 4 mesh minus 28 mesh, said composition containing substantially 45 to 75% by weight of plus 28 mesh particles in which the weight ratio of plus 10 mesh to minus 10 mesh plus 28 mesh particles lies between 0.66 and 1.33 and at least 20% by weight of particles finer than 65 mesh, said composition having an iron content not substantially more than 2.0%.

2. The composition defined in claim 1 wherein, in the additive, the weight percent of MgO plus the weight percent of $Cr_2O_3$ is 100.

3. The composition as defined in claim 1 wherein, in the additive, the weight percent of MgO plus the weight percent of $Al_2O_3$ is 100.

4. The composition defined in claim 1 wherein, in the additive, the weight percent of MgO is substantially 20 and the weight percent of $Cr_2O_3$ is substantially 80.

5. The composition defined in claim 1 wherein, in the additive, the weight percent of MgO is substantially 30 and the weight percent of $Al_2O_3$ is substantially 70.

6. The composition defined in claim 1 wherein the additive is only $Cr_2O_3$.

References Cited in the file of this patent
UNITED STATES PATENTS

| | | |
|---|---|---|
| 2,656,280 | Heuer | Oct. 20, 1953 |
| 3,036,925 | Heuer | May 29, 1962 |